United States Patent
DeHaan (10) Patent No.: US 9,280,399 B2
(45) Date of Patent: Mar. 8, 2016

(54) DETECTING, MONITORING, AND CONFIGURING SERVICES IN A NETWOWK

(75) Inventor: Michael Paul DeHaan, Morrisville, NC (US)

(73) Assignee: Red Hat, Inc., Raleigh, NC (US)

(*) Notice: Subject to any disclaimer, the term of this patent is extended or adjusted under 35 U.S.C. 154(b) by 399 days.

(21) Appl. No.: 12/475,146

(22) Filed: May 29, 2009

(65) Prior Publication Data

US 2010/0306347 A1 Dec. 2, 2010

(51) Int. Cl.
*G06F 15/177* (2006.01)
*G06F 9/54* (2006.01)
*G06F 15/173* (2006.01)
*G06F 15/16* (2006.01)

(52) U.S. Cl.
CPC ........................................ *G06F 9/54* (2013.01)

(58) Field of Classification Search
CPC ... G06F 9/5005; G06F 9/5011; G06F 9/5016; G06F 9/54
USPC .......................................................... 709/220
See application file for complete search history.

(56) References Cited

U.S. PATENT DOCUMENTS

| | | | |
|---|---|---|---|
| 6,154,128 A | 11/2000 | Wookey et al. | |
| 6,263,455 B1 | 7/2001 | Bannister | |
| 6,327,677 B1 | 12/2001 | Garg et al. | |
| 6,529,784 B1 | 3/2003 | Cantos et al. | |
| 6,611,869 B1 | 8/2003 | Eschelbeck et al. | |
| 6,636,521 B1 * | 10/2003 | Giulianelli | 370/407 |
| 6,721,880 B1 | 4/2004 | Pike | |
| 6,915,457 B1 | 7/2005 | Miller | |
| RE39,717 E * | 7/2007 | Yates et al. | 709/201 |
| 7,310,338 B1 * | 12/2007 | Foltan et al. | 370/392 |
| 7,373,553 B2 | 5/2008 | Tripp et al. | |
| 7,441,021 B1 * | 10/2008 | Perry | 709/223 |
| 7,469,284 B1 * | 12/2008 | Dubrovsky et al. | 709/223 |
| 7,660,824 B2 | 2/2010 | Halpern et al. | |
| 7,693,966 B2 | 4/2010 | Schmid | |
| 7,769,990 B1 | 8/2010 | Okcu et al. | |
| 7,856,496 B2 * | 12/2010 | Kline | 709/223 |
| 7,865,578 B1 | 1/2011 | Gerraty | |
| 2002/0184349 A1 * | 12/2002 | Manukyan | 709/221 |
| 2003/0055931 A1 | 3/2003 | Cravo De Almeida et al. | |
| 2003/0061323 A1 | 3/2003 | East et al. | |
| 2003/0120754 A1 | 6/2003 | Muto et al. | |
| 2003/0177412 A1 | 9/2003 | Todd | |
| 2003/0208589 A1 | 11/2003 | Yamamoto | |
| 2004/0006546 A1 | 1/2004 | Wedlake et al. | |
| 2004/0032625 A1 | 2/2004 | Yamano | |

(Continued)

OTHER PUBLICATIONS

"Systems and Methods for Remote Management of Networked Systems Using Secure Modular Platform", U.S. Appl. No. 12/130,424, filed May 30, 2008, Michael DeHaan et al.

*Primary Examiner* — Joseph Greene
(74) *Attorney, Agent, or Firm* — Lowenstein Sandler LLP (57) ABSTRACT

A services tool can detect, monitor, and manage software providing services in and for the network. The services tool can identify different types of software that provides services for the network ("services software") and types of software that provide support software ("support software") to the services software. The services tool can determine configuration data for both the services software and the support software. The services tool can automatically identify when particular services software needs to be linked to particular support software. The services tool can configure the services software and/or support software to link the two according to the rules.

14 Claims, 4 Drawing Sheets

(56) References Cited

U.S. PATENT DOCUMENTS

| | | | |
|---|---|---|---|
| 2004/0034577 A1 | 2/2004 | Van Hoose et al. | |
| 2004/0198319 A1 | 10/2004 | Whelan et al. | |
| 2004/0230828 A1 | 11/2004 | DeFuria et al. | |
| 2005/0066218 A1 | 3/2005 | Stachura et al. | |
| 2005/0198196 A1 | 9/2005 | Bohn et al. | |
| 2005/0223395 A1* | 10/2005 | Maeta et al. | 719/331 |
| 2006/0004806 A1 | 1/2006 | Kraft | |
| 2006/0031188 A1 | 2/2006 | Lara et al. | |
| 2006/0050862 A1 | 3/2006 | Shen et al. | |
| 2006/0075294 A1 | 4/2006 | Ma et al. | |
| 2006/0161444 A1 | 7/2006 | Lubrecht et al. | |
| 2007/0005661 A1 | 1/2007 | Yang | |
| 2007/0027936 A1 | 2/2007 | Stakutis et al. | |
| 2007/0038679 A1 | 2/2007 | Ramkumar et al. | |
| 2007/0074077 A1 | 3/2007 | Markow et al. | |
| 2007/0121527 A1 | 5/2007 | Zhou et al. | |
| 2007/0266124 A1 | 11/2007 | Kinyon et al. | |
| 2007/0288530 A1 | 12/2007 | Romem et al. | |
| 2008/0016186 A1* | 1/2008 | Ball | 709/220 |
| 2008/0091466 A1 | 4/2008 | Butler et al. | |
| 2008/0209033 A1 | 8/2008 | Ginter et al. | |
| 2008/0219563 A1 | 9/2008 | Moroney | |
| 2008/0244047 A1* | 10/2008 | Yeung et al. | 709/222 |
| 2009/0070442 A1* | 3/2009 | Kacin et al. | 709/221 |
| 2009/0132698 A1 | 5/2009 | Barnhill, Jr. | |
| 2009/0193413 A1 | 7/2009 | Lee | |
| 2009/0276620 A1 | 11/2009 | McCarron et al. | |
| 2009/0276772 A1 | 11/2009 | Garrett et al. | |
| 2009/0300180 A1 | 12/2009 | DeHaan et al. | |
| 2009/0300601 A1* | 12/2009 | Faus et al. | 717/176 |
| 2010/0077076 A1 | 3/2010 | Wada | |
| 2010/0088197 A1 | 4/2010 | DeHaan | |
| 2010/0131625 A1 | 5/2010 | DeHaan | |
| 2010/0185590 A1 | 7/2010 | D'Angelo et al. | |
| 2010/0198964 A1 | 8/2010 | Tanaka | |
| 2010/0218014 A1 | 8/2010 | Bozek et al. | |
| 2010/0223274 A1 | 9/2010 | DeHaan | |
| 2010/0223375 A1 | 9/2010 | DeHaan | |
| 2010/0275064 A1 | 10/2010 | DeCusatis et al. | |
| 2010/0306334 A1 | 12/2010 | DeHaan | |
| 2010/0306359 A1 | 12/2010 | DeHaan | |
| 2011/0047414 A1 | 2/2011 | Kudo et al. | |
| 2011/0055361 A1 | 3/2011 | DeHaan | |
| 2011/0055636 A1 | 3/2011 | DeHaan | |
| 2011/0055669 A1 | 3/2011 | DeHaan | |
| 2011/0055810 A1 | 3/2011 | DeHaan | |
| 2011/0078301 A1 | 3/2011 | DeHaan | |
| 2011/0107299 A1 | 5/2011 | DeHaan | |

* cited by examiner

DETECTING, MONITORING, AND CONFIGURING SERVICES IN A NETWOWK

FIELD

This invention relates generally to network management.

DESCRIPTION OF THE RELATED ART

Most entities such as companies and universities operate large networks of computing systems. These networks are typically made up of a wide variety of computing systems, such as servers providing various services and individual computing systems. As such, the computing systems in the network varying greatly in the hardware and software contained in the computing systems. Additionally, the computing systems in the network are often located in different physical locations. For example, a company may operate a network which spans multiple geographic regions (e.g. cities, countries, continents) and multiple regions in a single geographic region (e.g. multiple office building, different floors in the office building, different offices in the office building).

One or more system administrators are tasked with the job of tracking and maintaining the computing systems in the network. This involves diagnosing and fixing problems in the computing systems, insuring that the systems are properly configured, and the like. This involves also maintaining the programs and applications running in the network. Often, the programs and application are interconnected. For example, the services provided by one program (e.g. email server providing email services) may be supported by another program in the network (e.g. backup server providing email backup). These large networks also tend to grow and change organically over time. New computing systems may be added to the network or computing systems may be removed from the network. Additionally, the computing systems themselves change over time. The computing systems are reconfigured, new hardware and software are added, hardware and software are upgraded, and the like. As such, the administrator of these large networks are presented with a large and every-changing task of tracking the computing systems. Thus, it can be difficult to track and maintain the interdependency of programs and applications running the network.

BRIEF DESCRIPTION OF THE DRAWINGS

Various features of the embodiments can be more fully appreciated, as the same become better understood with reference to the following detailed description of the embodiments when considered in connection with the accompanying figures, in which.

DETAILED DESCRIPTION OF EMBODIMENTS

For simplicity and illustrative purposes, the principles of the present teachings are described by referring mainly to exemplary embodiments thereof. However, one of ordinary skill in the art would readily recognize that the same principles are equally applicable to, and can be implemented in, all types of information and systems, and that any such variations do not depart from the true spirit and scope of the present teachings. Moreover, in the following detailed description, references are made to the accompanying figures, which illustrate specific embodiments. Electrical, mechanical, logical and structural changes may be made to the embodiments without departing from the spirit and scope of the present teachings. The following detailed description is, therefore, not to be taken in a limiting sense and the scope of the present teachings is defined by the appended claims and their equivalents.

Embodiments of the present teachings relate to systems and methods for managing a network of computing systems and devices. More particularly, an administrator can utilize a services tool to manage the interdependency of software providing services in the network.

According to embodiments, an administrator system can be configured to include a services tool. The services tool can be configured to detect, monitor, and manage software providing services in and for the network. The services tool can be configured to identify different types of software that provide services for the network ("services software") and types of software that provide support ("support software") to the services software. The services tool can be configured to determine configuration data for both the services software and the support software.

According to embodiments, the services tool can be configured to automatically identify when particular services software needs to be linked to particular support software. The services tool can be configured to receive rules that define the interdependency of the services software and the support software. The services tool can be configured to identify services software that is not currently linked to the support software according to the rule. The services tool can configure the services software and/or support software to link the two according to the rules.

By utilizing the services tool, the administrator system can provide robust tools for identifying software in the network whether providing services or supporting other software in the network. Likewise, the administrator tool can automate the process for configuring the services and support software to be properly connected. As such, the services tool can reduce the time and effort of managing the network.

Figure 1:
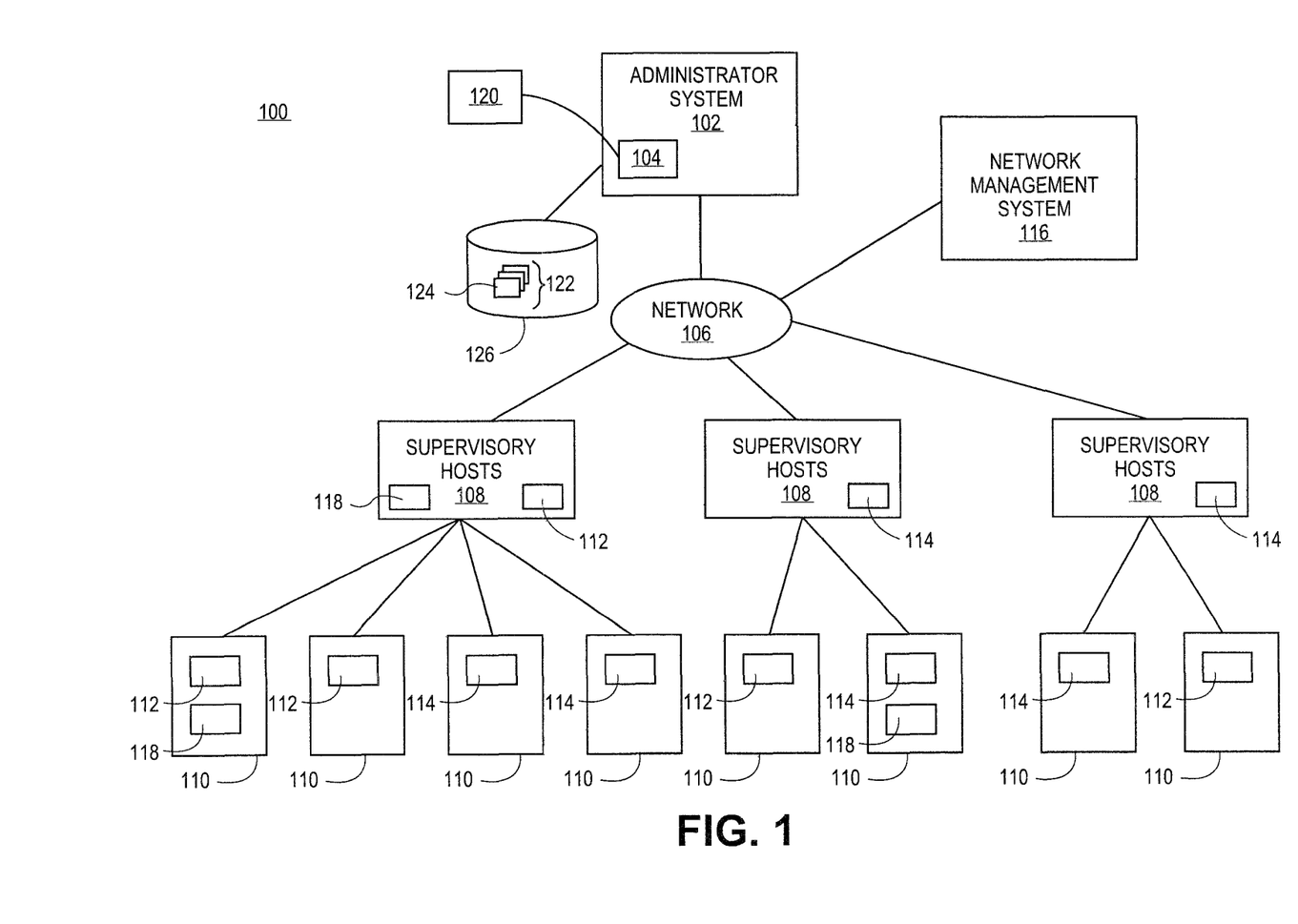
FIG. 1 illustrates a network of computing systems implementing a services tool, in which various embodiments of the present teachings can be practiced.

FIG. 1 illustrates a network system 100, according to various embodiments of the present teachings. In embodiments as shown, an administrator system 102 can include a services tool 104 for detecting, monitoring and configuring software providing services in the network system 100 and software providing support to the services software. While FIG. 1 illustrates a number of computing systems connected by one or more networks, one skilled in the art will realize that network system 100 can comprise any number of computing system and networks.

In embodiments, the network system 100 can include a number of computing systems connected by one or more networks 106. In embodiments, the one or more networks 106 can be or include the Internet, or other public or private networks. The one or more or more networks 110 can be or include wired, wireless, optical, and other network connections. One skilled in the art will realize that the one or more networks 106 can be any type of network, utilizing any type of communication protocol, to connect the computing systems.

In embodiments as illustrated in FIG. 1, the computing systems in the network system 100 can include a variety of different computing systems. The network system 100 can include a number of supervisory hosts 108. The supervisory hosts 108 can be or include a set of servers configured to communicate with entities at other levels of the network system 100 such as the one or more networks and/or associated connections. The supervisory hosts 108 can be configured to communicate with an intermediate set or sets of hosts, gateways, or servers. The supervisory hosts 108 can be configured to function as "overlord" hosts or servers which communicate with an underlying or low-level computing systems 110, or other devices in the network system 100. The computing systems 110 can include any type of computing systems or other devices such as such as servers, personal computers, laptop computers, network-enabled media devices, networked stations, etc.

In embodiments, the supervisory hosts 108 can be configured to support or serve underlying networks in the network system 100, for example via a local area network, or other network(s) or connections. Other hierarchies, topologies, and connections between the supervisory hosts 108, any intermediate hosts, the computing systems 110, and/or other entities or devices of the network system 100 can be used.

In embodiments, the supervisory hosts 108 and the computing systems 110 can include any number and types of software programs and packages. For example, one or more of the supervisory hosts 108 and the computing systems 110 can include services software 112. The services software 112 can be any types of application programs and packages, which are executing on the supervisory hosts 108 and the computing systems 110 in order to provide services to the network system 100 and to other networks and entities. For instance, the services software 112 can provide services such as website hosting, electronic mail (email) hosting, printing services, storage services, application hosting, and the like.

In embodiments, one or more of the supervisory hosts 108 and the computing systems 110 can include support software 114. The support software 114 can be any types of application programs and packages, which are executing on the supervisory hosts 108 and the computing systems 110, in order to provide services and support to the services software 112. For instance, the support software 114 can perform support and services such as backup services, monitoring services, trending services, storage services, log file hosting, and the like.

In embodiments, in order for the support software 114 to provide the services to the services software 112, appropriate ones of the support software 114 can be matched with appropriate ones of the services software 112. For example, a particular services software 112 may require certain services, such as backup services, and, therefore, can be matched with a particular support software 114 providing that certain service. Likewise, both the services software 112 and the support software 114 can be configured in order to establish communications between the services software 112 and the support software 114.

In embodiments, the administrator system 102 can be configured to detect, to monitor, and to configure the services software 112 and the support software 114 in order to properly match the services software 112 and the support software 114 and to properly configure communication between the services software 112 and the support software 114. The administrator system 102 can be configured to perform the detecting, monitoring, and configuring at the direction of an administrator or other person. Likewise, the administrator system 102 can be configured to perform the detecting, monitoring, and configuring, automatically, for instance, periodically or upon the occurrence of events. To achieve this, the administrator system 102 can be configured to include the services tool 104.

In embodiments, the administrator system 102 can be any type of computing system or other device such as such as a server, personal computer, laptop computer, network-enabled media device, networked station, etc. The administrator system 102 can be coupled to the one or more networks 106 in order to communicate with the supervisory hosts 108 and the computing systems 110. The administrator system 102 can be operated by an administrator to monitor and configure the services software 112 and the support software 114 and related services in the network system 100.

In embodiments, the services tool 104 can be configured to determine the services software 112 and the support software 114 contained in the supervisory 108 and the computing system 110, and the services provided by the services software 112 and the support software 114. The services tool 104 can be configured to determine this information on-demand from the administrator and/or automatically, for instance, periodically or upon the occurrence of events. Likewise, the services tool 104 can be configured to determine configuration data of the services software 112 and the support software 114. The configuration data can include information uniquely identifying the services software 112 and the support software 114 (type and manufacturer of the software, unique identifier of the computing system executing the software, etc.), information describing how to communicate with the services software 112 and the support software 114 (network information of the computing system executing the software, application programming interfaces (APIs) of the software, access and security information, etc.), information describing existing connections between the services software 112 and the support software 114, and the like.

In embodiments, to determine this information, the services tool 104 can be configured to gather information on the network 106, the supervisory host 108, the computing systems 110, the services software 112 and the support software 114 utilizing a variety of processes, methods and systems. The services tool 104 can be configured to directly query and examine the supervisory host 108 and the computing systems 110 in order to determine the services software 112 and the support software 114 and the configuration data for the services software 112 and the support software 114. To enable this, the services tool 104 can be configured to include the necessary logic, commands, and protocols to query and to examine each of the supervisory hosts 108 and the computing systems 108 in order to determine the services software 112 and the support software 114 and the configuration data for the services software 112 and the support software 114.

In embodiments, the services tool 104 can be configured to communicate with other systems in order to determine the services software 112 and the support software 114 and the configuration data for the services software 112 and the support software 114. The services tool 104 can be configured communicate with a network management system 116. The network management system 116 can be any type of network management application or tool, located separate from or incorporated in the administrator system 102, to securely communicate with the supervisory hosts 108 and the computing systems 110, to monitor the state of the supervisory hosts 108 and the computing systems 110, to retrieve and request data from the supervisory hosts 108 and the computing systems 110, and to manage and direct the supervisory hosts 108 and the computing systems 110. For example, the network management system 116 can be a "FUNC" server as described in U.S. patent application Ser. No. 12/130,424, filed May 30, 2008, entitled "SYSTEMS AND METHODS FOR REMOTE MANAGEMENT OF NETWORKED SYSTEMS USING SECURE MODULAR PLATFORM" (U.S. Patent Application Publication No. 2009/0300180) assigned to Red Hat Corporation, the disclosure of which is incorporated herein, in its entirety, by reference.

In embodiments, the services tool 104 can be configured to communicate with application programs executing on the supervisory host 108 and the computing systems 110 in order to determine to determine the services software 112 and the support software 114 and the configuration data for the services software 112 and the support software 114. For example, in order to aid in identifying the information, one or more of the supervisory hosts 108 and the computing systems 110 can include a monitoring agent 118. The monitoring agent 118 can be configured to examine the supervisory host 108 and the computing systems 110, to determine the services software 112 and the support software 114 and the configuration data for the services software 112 and the support software 114, and to provide this information to the services tool 104. The monitoring agent 118 can provide the information directly to the services tool 104 and/or to other systems in the network system 100 such as the network management system 116. The monitoring agent 118 can be configured to include the necessary logic, routines, instruction, and commands to communicate with the hardware and software resources of the supervisory hosts 108 and the computing systems 110 in order to determine the services software 112 and the support software 114 and the configuration data for the services software 112 and the support software 114.

In embodiments, to determine the services software 112 and the support software 114 and the configuration data for the services software 112 and the support software 114, the services tool 104 can be configured to collect the information about the services software 112 and the support software 114 from the administrator of the network system 100 or other persons. The services tool 104 can be configured to generate an interface 120 that enables the administrator to enter information about the supervisory hosts 108, the computing systems 110, the services software 112, and the support software 114. To enable this, the services tool 104 can be configured to include the necessary logic, commands, and protocols to generate the interface 120 and to receive the information entered into the interface 120. For example, the services tool 104 can be configured to include one or more application programming interfaces (APIs) to generate graphic user interfaces (GUIs) that allow the administrator to enter the information.

In embodiments, once the services tool 104 has determined the information for the services software 112 and the support software 114, the services tool 104 can be configured to classify the information and store the information in a set 122 or records 124. The services tool 104 can be configured to maintain the set 122 of records 124 in computer readable storage devices or media 126 (CD, DVD, hard drive, portable storage memory, etc.) whether local to the administrator system 102 or remotely located.

In embodiments, the set 122 of inventory records 124 can be configured to store all the collected information related to the services software 112 and the support software 114. Each inventory record 124 in the set 122 can be configured to store the information related to one services software 112 or support software 114. For example, the set 122 of inventory records 124 can be recorded in a file, tree, database, or other record. Each inventory record 124 can include information that uniquely identifies the services software 112 or the support software 114, such as a specific name, manufacturer, version of the software combined with a unique identifier of the supervisory host 108 or computing system 110 supporting the software (Media Access Control ("MAC") address, Ethernet Hardware Address ("EHA"), computing system name, and the like). Additionally, each inventory record 124, for that particular services software 112 or support software 114, can include information describing the services provided by the services software 112 or support software 114, information describing how to communicate with the services software 112 or support software 114 (network information of the computing system executing the software, application programming interfaces (APIs) of the software, access and security information etc.), information describing existing connections between that particular software and other services software 112 and support software 114, and the like.

In embodiments, the services tool 104 can be configured to identify one or more of the services software 112 that needs to receive support or services provided by one or more of the support software 114, either under the direction of the administrator or automatically. The services tool 104 can be configured to receive an identification of a particular services software 112 that require support from one of the support software 114. For example, the administrator can examine the information collected from the services software 112 and notify the services tool 104 that the particular services software 112 needs to be supported by one of the support software 114. The services tool 104 can be configured to receive the identification of a particular services software 112 that needs support from one or more of the support software 114 via the interface 120.

In embodiments, the services tool 104 can be configured to automatically identify the services software 112 that to be supported by the support software 114. The services tool 104 can be configured to receive rules from the administrator defining when particular services software 112 needs to receive support or services provided by one or more of the support software 114. For example, the administrator can determine that a particular type of services software 112, e.g. website hosting server, should always be supported by a particular type of support software 114, e.g. backup server, and provide a rule defining this relationship to the services tool 104. When the services tool 104 determines the services software 112 and the support software 114, the services tool 104 can be configured to compare the determined information to the rules to determine if any particular services software 112 needs to receive support or services provided by one or more of the support software 114. For instance, in the above example, the services tool 104 can examine the network system 100, determine that a computing system 110 contains the particular services software 112, website hosting server, and examine the rules to determine that the particular services software 112 should be supported by the particular support software 114, backup server, if not already supported.

In embodiments, if the services software 112 are to be supported by the support software 114, the services tool 104 can be configured to establish communications between the services software 112 and the support software 114. The services tool 104 can configure the services software 112 and/or the support software 114 to communicate in order to link the services provided by the support software 114 to the services software 112. The services tool 104 can configure the services software 112 and/or the support software 114 using the configuration data of the services software 112 and/or the support software 114. For example, the services tool 104 can configure the services software 112 and/or the support software 114 with the network and access information and configure the APIs to establish a communication channel, such a message bus, web service, or other channel, between the services software 112 and the support software 114. The services tool 104 can determine the configuration data from examining the network system 100 and/or from the set 122 of records 124 as described above.

Figure 2:
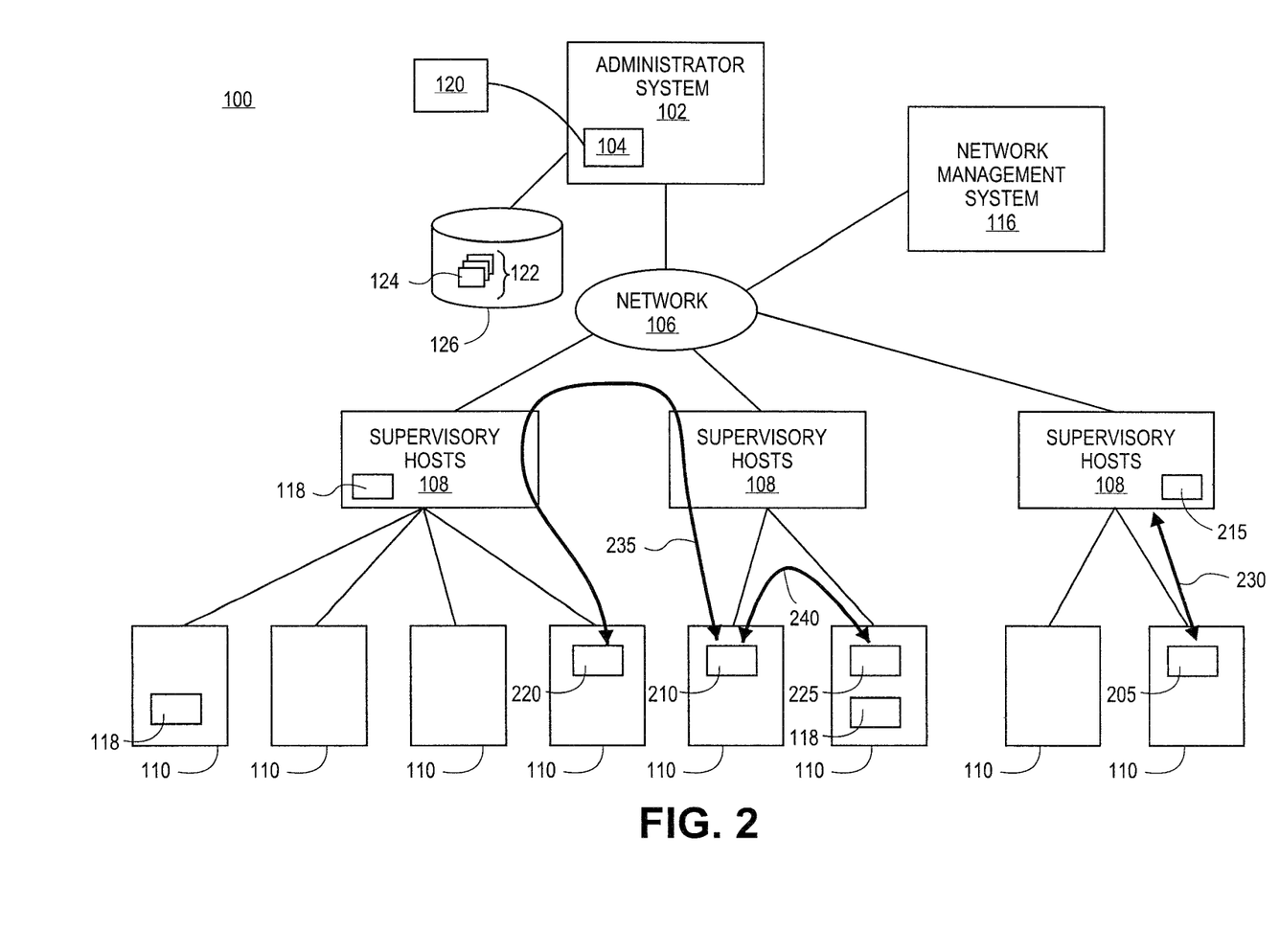
FIG. 2 illustrates several examples of processes performed by the services tool in the network, according to various embodiments.

FIG. 2 illustrates the network system 100 and several exemplary process performed by the administrator system 102 and the services tool 104, according to various embodiments of the present teachings. While FIG. 2 illustrates and described several exemplary process, one skilled in the art will realize that the administrator system 102 and the services tool 104 can perform any number of processes as described above and below.

In embodiments, the supervisory hosts 108 and the computing systems 110 can include any number and types of software programs and packages. For example, one or more of the computing systems 110 can include services software 205 and 210. The services software 205 and 210 can be any types of application programs and packages, which are executing on the computing systems 110, in order to provide services to the network system 100 and to other networks and entities. For instance, the services software 205 can be an printing services hosting application, such as CUPS developed by APPLE, Inc., and the services software 210 can be a website hosting application, such as Apache.

Additionally, for example, one or more of the supervisory hosts 108 and the computing systems 110 can include support software 215, 220, and 225. The support software 215, 220, and 225 can be any types of application programs and packages, which are executing on the supervisory hosts 108 and the computing systems 110, in order to provide services and support to the services software 205 and 210 and other software and systems. For instance, the support software 215 can be a monitoring software program, the support software 220 can be a logfile hosting application program, and the support software 225 can be a backup application program.

In one exemplary process, the administrator system 102 can determine the services software 205, 210 and the support software 215, 220, and 225 and the services provided utilizing the services tool 104. The services tool 104 can gather information on the network 106, the supervisory host 108, the computing systems 110, t the services software 205, 210 and the support software 215, 220, and 225 utilizing a variety of processes and methods and store the information in the set 122 or records 124 as described above in FIG. 1. The services tool 104 can gather and store this information at the direction of an administrator utilizing the administrator system 102. Likewise, the services tool 104 can gather and store this information automatically, for instance, on a periodic basis or upon the occurrence of an event (new computing systems added, computing systems removed, new software added, software removed, failure of a computing system or software, attack on the network system 100, and the like) in order to manage the services provided by the services software 205, 210 and the support software 215, 220, and 225.

In another example, the administrator system 102 can identify the services software 205 and 210 that needs to be supported by the support software 215, 220, and 225 and configure the services software 205, 210 and/or the support software 215, 220, and 225, at the direction of the administrator. In one example, an administrator can determine that the services software 205, CUPS, needs to be supported by the support software 215, monitoring software program. The administrator can direct the services tool 104 to configure the services software 205 and/or the support software 215 so that the support software 215 can provide monitoring services to the services software 205. The services tool 104 can configure the services software 205 and/or the support software 215 to establish a communications channel 230 between the services software 205 and the support software 215. For example, the services tool 104 can configure the APIs of the services software 205 and/or the support software 215 create the communication channel 230. The services tool 104 can configure the services software 205 and/or the support software 215 utilizing information gather from the services software 205 and/or the support software 215 or stored in the set 122 of records 124.

In embodiments, the administrator system 102 can identify the services software 205 and 210 that needs to be supported by the support software 215, 220, and 225 and configure the services software 205, 210 and/or the support software 215, 220, and 225, automatically. In one example, an administrator can provide a rule to the services tool 104 that any type of the services software 210, Apache, needs to be supported by the support software 220, logfile hosting application, and the support software 225, backup hosting application program.

In this example, the services tool 104 can identify that the services software 210 exists in the network 100, when gather information from the network system 100, for instance, periodically or upon the occurrence of an event, and can identify that the services software 210 is not currently supported by the support software 220 and 225. Upon discovering the lack of support, the services tool 104 can automatically configure the services software 210 and/or the support software 220 to establish a communications channel 235 between the services software 210 and the support software 220. Likewise, the services tool 104 can automatically configure the services software 210 and/or the support software 225 to establish a communications channel 240 between the services software 210 and the support software 225. For example, the services tool 104 can configure the APIs of the services software 210, the support software 220, and/or the support software 225 create the communication channels 235 and 240. The services tool 104 can configure the services software 210, the support software 220, and/or the support software 225 utilizing information gathered from the software services 210, the support software 220, and/or the support software 225 or stored in the set 122 of records 124.

Figure 3:
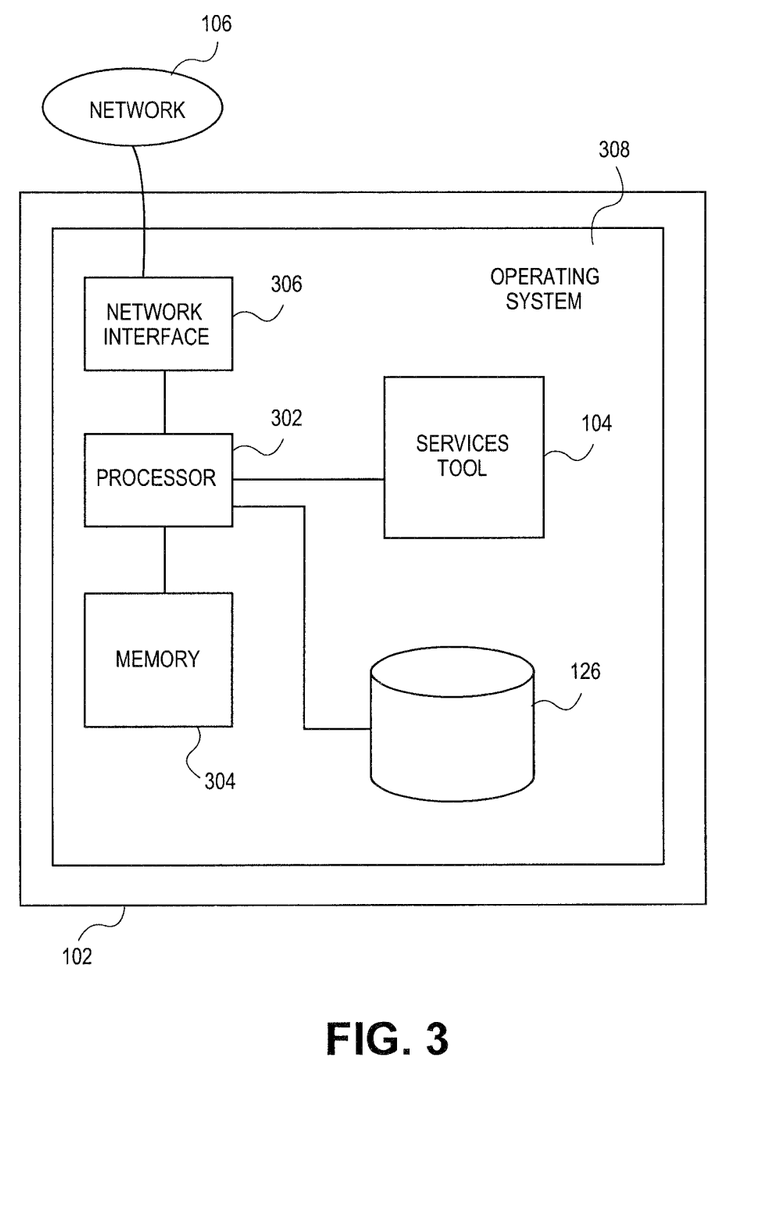
FIG. 3 illustrates an exemplary hardware configuration for an administrator computing system, according to various embodiments.

FIG. 3 illustrates an exemplary diagram of hardware and other resources that can be incorporated in the administrator system 102 and configured to communicate with the with the network system 100 via one or more networks 106, according to embodiments. In embodiments as shown, the administrator system 102 can comprise a processor 302 communicating with memory 304, such as electronic random access memory, operating under control of or in conjunction with operating system 308. Operating system 308 can be, for example, a distribution of the Linux™ operating system, such as SELinux, the Unix™ operating system, or other open-source or proprietary operating system or platform. Processor 302 also communicates with one or more computer readable storage devices or media 126, such as hard drives, optical storage, and the like. Processor 302 further communicates with network interface 306, such as an Ethernet or wireless data connection, which in turn communicates with one or more networks 106, such as the Internet or other public or private networks.

Processor 302 also communicates with the services tool 104, to execute control logic and allow perform the service detection and configuration as described above and below. Other configurations of the administrator system 102, associated network connections, and other hardware and software resources are possible.

While FIG. 3 illustrates the administrator system 102 as a standalone system including a combination of hardware and software, the administrator system 102 can include multiple systems operating in cooperation. The services tool 104 can be implemented as a software application or program capable of being executed by the administrator system 102, as illustrated, or other conventional computer platforms. Likewise, the services tool 104 can also be implemented as a software module or program module capable of being incorporated in other software applications and programs. In any example, the services tool 104 can be implemented in any type of conventional proprietary or open-source computer language. When implemented as a software application or program code, the services tool 104 can be stored in a computer readable storage medium, such as storage 126, accessible by the administrator system 102.

Figure 4:
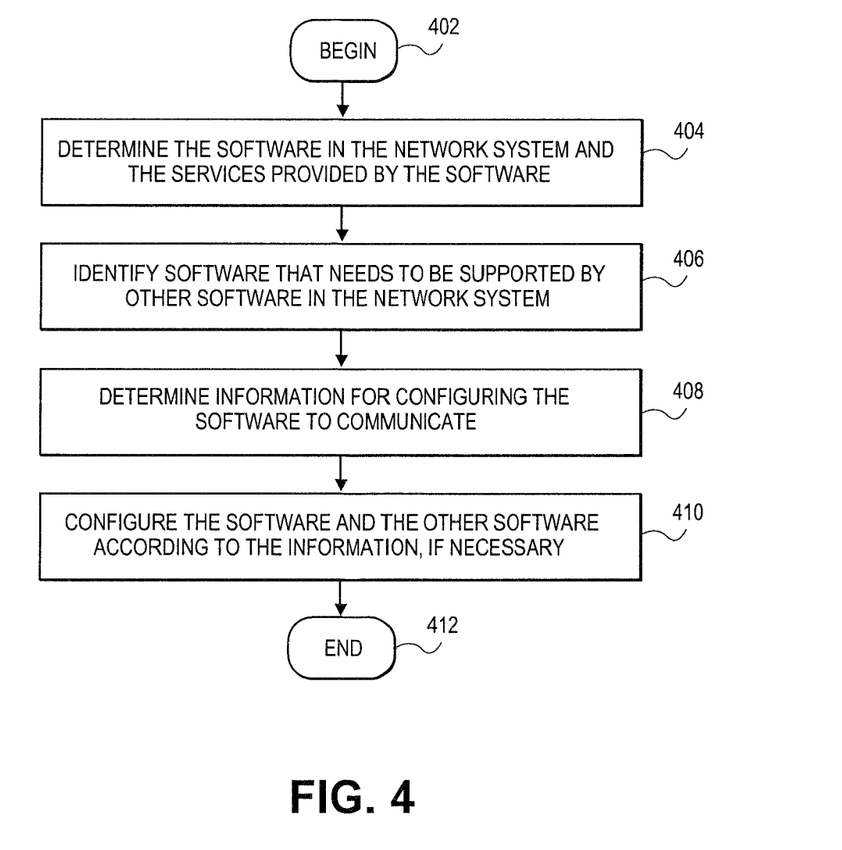
FIG. 4 illustrates a flowchart of an exemplary process for managing services, according to various embodiments.

FIG. 4 illustrates a flow diagram for configuring services in a network system 100, according to embodiments of the present teachings. In 402, the process can begin. In 404, the administrator system 102 can determine the software in the network system 100 and the services provided by the software. For example, the services tool 104 can examine the network system 100 at the request of the administrator or automatically, for instance, periodically or upon the occurrence of an event. The services tool 104 can gather information on the network 106, the supervisory host 108, the computing systems 110, the services software 112 and the support software 114 utilizing a variety of processes, methods and systems, as described above.

In 406, the administrator system 102 can identify software that needs to be supported by other software in the network system 100. For example, the administrator can provide an indication of the services software 112 that needs to be supported by the support software 114. Likewise, the services tool 104 can automatically identify the services software 112 that needs to be supported by the support software 114.

In 408, the administrator system 102 can determine information for configuring the software to communicate. For example, the services tool 104 can examine the network 106, the supervisory host 108, the computing systems 110, the services software 112, and/or the support software 114 to determine the configuration data. Likewise, the services tool 104 can examine the set 122 of records 124.

In 410, the administrator system 102 can configure the software and the other software according to the information, if necessary. For example, the services tool 104 can configure the services software 112 and/or the support software 114 to communicate in order to link the services provided by the support software 114 to the services software 112. The services tool 104 can configure the services software 112 and/or the support software 114 using the configuration data of the services software 112 and/or the support software 114. For example, the services tool 104 can configure the services software 112 and/or the support software 114 with the network and access information and configure the APIs to establish a communication channel, such a message bus, web service, or other channel, between the services software 112 and the support software 114.

In 412, the process can end, but the process can return to any point and repeat.

Certain embodiments may be performed as a computer application or program. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable medium, which include computer readable storage devices and media, and signals, in compressed or uncompressed form. Exemplary computer readable storage devices and media include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present teachings can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

While the teachings has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Furthermore, to the extent that the terms "including", "includes", "having", "has", "with", or variants thereof are used in either the detailed description and the claims, such terms are intended to be inclusive in a manner similar to the term "comprising." As used herein, the term "one or more of" with respect to a listing of items such as, for example, A and B, means A alone, B alone, or A and B. Those skilled in the art will recognize that these and other variations are possible within the spirit and scope as defined in the following claims and their equivalents.

What is claimed is:

1. A method comprising:
    maintaining, by a processor, a plurality of rules defining interdependencies between a plurality of services software applications and a plurality of support software applications;
    collecting by the processor, periodically or upon an occurrence of an event, application programming interface information associated with the plurality of services software applications and the plurality of support software applications;
    identifying, in view of a first rule of the plurality of rules, a first services software application of the plurality of services software applications in need of support from a first support software application of the plurality of support software applications;
    determining first application programming interface information to establish communications between the first services software application and the first support software application; and
    configuring, by the processor, at least one of the first services software application or the first support software application according to the first application programming interface information to establish a communication channel between the first services software application and the first support software application.

2. The method of claim 1, wherein identifying the first services software application in need of support from the first support software application comprises:
    receiving an identification of the first services software application in need of support from the first support software application.

3. The method of claim 1, further comprising:
querying the first services software application and the first support software application to collect the application programming interface information.

4. The method of claim 1, further comprising:
storing the application programming interface information in a computer readable storage medium.

5. The method of claim 1, further comprising:
instructing a management system to query the first services software application and the first support software application to collect the application programming interface information.

6. The method of claim 1, further comprising:
receiving the application programming interface information from a monitoring application querying the first services software application and the first support software application.

7. A non-transitory computer readable storage medium comprising instructions that, when executed by a processor, cause the processor to:
maintain a plurality of rules defining interdependencies between a plurality of services software applications and a plurality of support software applications;
collect by the processor, periodically or upon an occurrence of an event, application programming interface information associated with the plurality of services software applications and the plurality of support software applications;
identify, in view of a first rule of the plurality of rules, a first services software application of the plurality of services software applications in need of support from a first support software application of the plurality of support software applications;
determine first application programming interface information to establish communications between the first services software application and the first support software application; and
configure, by the processor, at least one of the first services software application or the first support software application according to the first application programming interface information to establish a communication channel between the first services software application and the first support software application.

8. The non-transitory computer readable storage medium of claim 7, the processor to receive an identification of the first services software application to receive support from the first support software application.

9. The non-transitory computer readable storage medium of claim 7, the processor to: query the first services software application and the first support software application to collect the application programming interface information.

10. The non-transitory computer readable storage medium of claim 7, the processor to: store the application programming interface information in a computer readable storage medium.

11. The non-transitory computer readable storage medium of claim 7, the processor to: instruct a management system to query the first services software application and the first support software application to collect the application programming interface information.

12. The non-transitory computer readable storage medium of claim 7, the processor to: receive the application programming interface information from a monitoring application querying the first services software application and the first support software application.

13. A system comprising:
a memory comprising maintain, a plurality of rules defining interdependencies between a plurality of services software applications and a plurality of support software applications; and
a processor operatively coupled to the memory, the processor to:
collect by the processor, periodically or upon an occurrence of an event, application programming interface information associated with the plurality of services software applications and the plurality of support software applications;
identify, in view of a first rule of the plurality of rules, a first services software application of the plurality of services software applications in need of support from a first support software application of the plurality of support software applications;
determine first application programming interface information to establish communications between the first services software application and the first support software application; and
configure using the processor, at least one of the first services software application or the first support software application according to the first application programming interface information to establish a communication channel between the first services software application and the first support software application.

14. The system of claim 13, the processor to receive an identification of the first services software application that requires support from the first support software application.

* * * * *